(12) United States Patent
May et al.

(10) Patent No.: US 7,724,843 B2
(45) Date of Patent: May 25, 2010

(54) CLOCK ADJUSTMENT FOR A HANDHELD AUDIO SYSTEM

(75) Inventors: Michael R. May, Austin, TX (US); Lawrence Henry Ragan, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1072 days.

(21) Appl. No.: 11/405,887

(22) Filed: Apr. 18, 2006

(65) Prior Publication Data

US 2007/0242780 A1    Oct. 18, 2007

(51) Int. Cl.
*H04L 27/06*    (2006.01)
*H04L 27/00*    (2006.01)

(52) U.S. Cl. ........................ 375/340; 375/326
(58) Field of Classification Search .................. 375/340, 375/326
See application file for complete search history.

(56) References Cited

U.S. PATENT DOCUMENTS

| | | | | |
|---|---|---|---|---|
| 6,154,497 A * | 11/2000 | Gatherer et al. ............. | 375/247 |
| 6,564,040 B1 * | 5/2003 | Fujiwara ....................... | 455/76 |
| 7,573,809 B2 * | 8/2009 | Meagher et al. ............. | 370/216 |
| 2006/0209892 A1 * | 9/2006 | MacMullan et al. ......... | 370/468 |
| 2007/0009071 A1 * | 1/2007 | Singh ......................... | 375/354 |

* cited by examiner

*Primary Examiner*—David C Payne
*Assistant Examiner*—Nader Bolourchi
(74) *Attorney, Agent, or Firm*—Meschkow & Gresham, P.L.C.

(57) ABSTRACT

A handheld audio system having a radio signal decoder that includes a method for adjusting a system clock. Adjusting the system clock includes receiving a signal at a rate of a receive clock, wherein the signal includes data at a transmit rate. An error term is determined between the receive rate and the transmit rate. Based on the receive clock and the error term, where the error term is non-zero, a clock signal is generated.

5 Claims, 11 Drawing Sheets

FIG. 1
battery-powered handheld audio device 90

FIG. 4
front-end module 66

FIG. 5
baseband processing module 70

FIG. 6
pilot tracking module 146

FIG. 7
frequency error vs. $V_{xtal}$

FIG. 8
clock adjust module 89

CLOCK ADJUSTMENT FOR A HANDHELD AUDIO SYSTEM

BACKGROUND

1. Technical Field

This invention relates generally to portable handheld digital audio systems and more particularly to integrated circuits for a handheld audio/visual system.

2. Description of Related Art

As is known, handheld digital audio systems are becoming very popular. Such systems include digital audio players/recorders that record and subsequently playback MP3 files, WMA files, etc. Such digital audio players/recorders may also be used as digital dictaphones and file transfer devices. Further expansion of digital audio players/recorders includes providing a frequency modulation ("FM") radio receiver such that the device offers FM radio reception.

While digital audio players/recorders are increasing their feature sets, the increase in feature sets has been done in a less than optimal manner. For instance, with the inclusion of an FM receiver in a digital audio player/recorder, the FM receiver is a separate integrated circuit from the digital audio player/recorder chip set, or integrated circuit ("IC"). As such, the FM receiver IC functions completely independently of the digital audio player/recorder IC, even though both ICs include some common functionality.

Though FM decoders have been provided, a need still exists for a method and apparatus of radio decoding that is optimized to function with a digital audio player/recorder to produce an optimized handheld audio system.

DETAILED DESCRIPTION OF THE DRAWINGS

Figure 1:
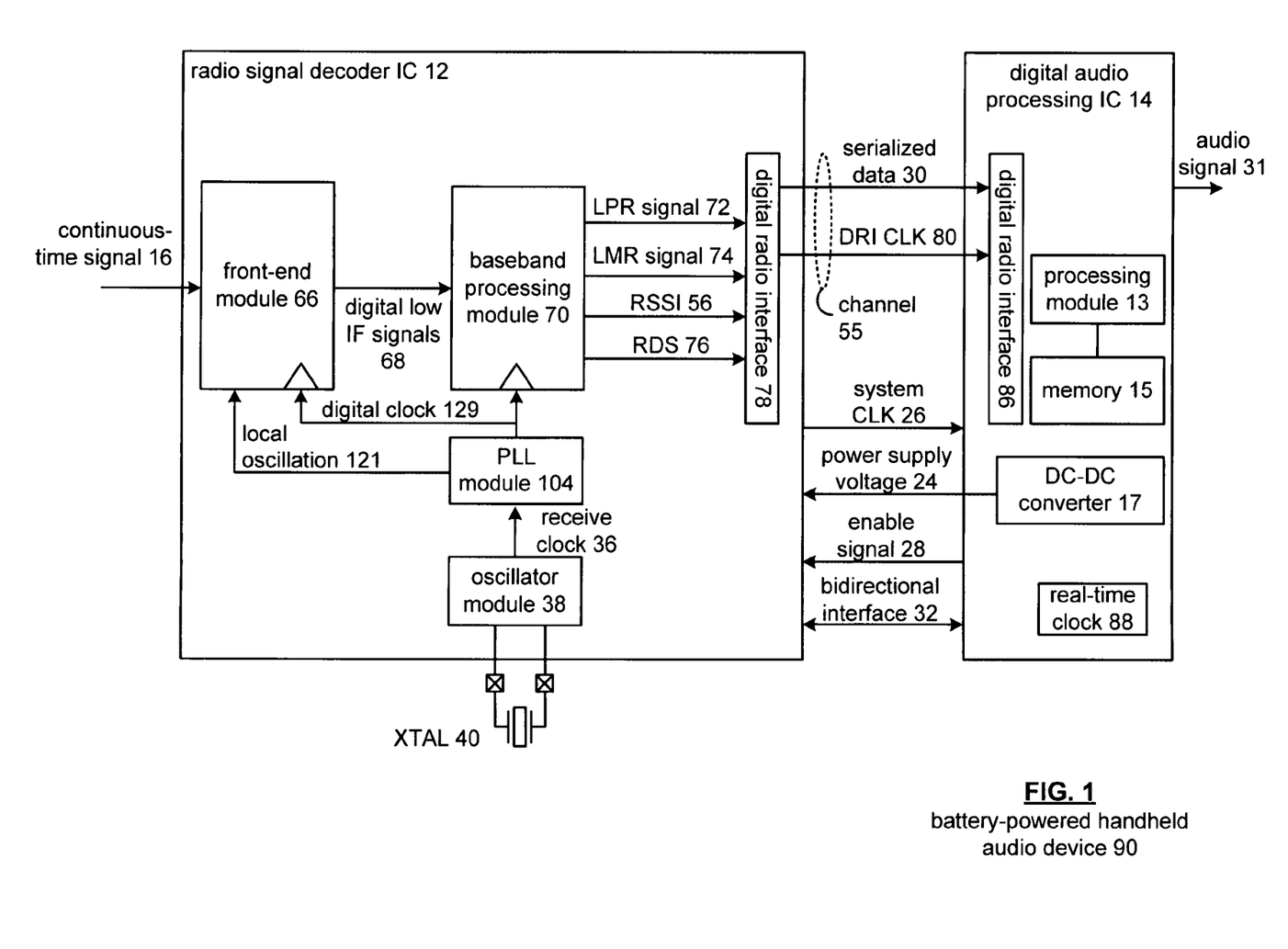
FIG. 1 is a schematic block diagram of a handheld audio system in accordance with the present invention.

FIG. 1 is a schematic block diagram of a handheld audio device 90 that includes a radio signal decoder integrated circuit 12 and a digital audio processing integrated circuit 14. The digital audio processing integrated circuit 14 includes a processing module 13, memory 15, a DC-to-DC converter 17, and a real-time clock ("RTC") 88.

The processing module 13 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 15 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 13 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory 15 stores, and the processing module 13 executes, operational instructions corresponding to at least some of the steps and/or functions illustrated in FIGS. 1 through 12.

In operation, when a battery, or other external power source, is initially applied to the radio signal decoder 12, which will be described in greater detail with reference to FIGS. 2 through 12, and the digital audio processing IC 14, the DC-DC converter 17 generates a power supply voltage 24 based on an internal oscillation. When the power supply voltage 24 reaches a desired value (for example, near a regulated value), the processing module 13 may provide an enable signal 28 to the radio signal decoder IC 12. In response to the enable signal 28, the radio signal decoder IC 12 generates the system clock 26. In other embodiments, radio signal decoder IC 12 generates the system clock 26 when the power supply voltage 24 reaches a predetermined value. With the remaining radio signal decoder 12 functionality being inactive, the radio signal decoder IC 12 awaits a second enable signal to enable further functionality. The radio signal decoder 12 provides the system clock 26 to the audio processing integrated circuit 14. Upon receiving the system clock 26, the DC-DC converter switches from an internal oscillation to the system clock 26 to produce the power supply voltage 24 from a battery voltage or external power source.

With the system clock 26 functioning, the radio signal decoder IC 12 converts a continuous-time signal 16, such as a radio signal, into left- and right-channel signals, which may be analog or digital audio signals. In one embodiment, the left- and right-channel signals include a left-plus-right ("LPR") signal 72 and a left-minus-right ("LMR") signal 74, which are described in detail with respect to FIG. 2. The radio signal decoding IC 12 provides the left- and right-channel signals via the serialized data 30 to the digital audio processing IC 14.

The digital audio processing integrated circuit 14, which may be a digital audio player/recorder integrated circuit such as the STMP35XX and/or the STMP36XX digital audio processing system integrated circuits manufactured and distributed by SigmaTel Incorporated, receives the left- and right-channel signals via channel 55 (which includes serialized data 30 and digital radio interface clock 80) and produces therefrom audio signals 31. The digital audio processing IC 14 may provide the audio signals 31 to a headphone set or other type of speaker output. As an alternative to producing the audio signals 31 from the left- and right-channel signals, the digital audio processing integrated circuit 14 process stored MP3 files, stored WMA files, and/or other stored digital audio files to produce the audio signals 31. Additionally, digital audio processing integrated circuit 14 may process media information including video signals, still images and/or a combination of these with audio signals.

The radio signal decoder IC 12 includes a front-end module 66, a baseband processing module 70, and a digital radio interface 78. The digital audio processing IC 14 includes a digital radio interface 86. The digital radio interface 78 and the digital radio interface 86 are coupled via a channel 55. The channel 55 may be a synchronous or an asynchronous channel. The front-end module 66 contains circuitry to process and convert the continuous-time signal 16 to digital data, shown as digital low intermediate frequency ("IF") signals 68. The baseband processing module 70 is operably coupled to convert the digital low IF signals 68 into digital baseband signals and to produce therefrom the LPR signal 72 and LMR signal 74 that contain the audio data provided by the continuous-time signal 16. For a more detailed discussion of the front-end circuitry and/or the baseband processing refer to co-pending patent application entitled HANDHELD AUDIO SYSTEM, having a filing date of May 11, 2005, and a Ser. No. 11/126,554, which is hereby incorporated herein by reference.

The digital radio interface 78 is operably coupled to the digital radio interface 86 to provide at least the LPR signal 72 and the LMR signal 74 to the digital audio processing integrated circuit 14. For a more detailed discussion of the digital radio interface 78 refer to U.S. patent application entitled CHANNEL INTERFACE FOR CONVEYING DIGITAL DATA HAVING A LOWER DATA RATE, having a filing date of Sep. 9, 2005, and a Ser. No. 11/222,535, which is hereby incorporated herein by reference.

Within the radio signal decoder IC 12, the digital radio interface 78 converts the parallel LPR signal 62, LMR signal 64, and RDS data 68 into a serialized data signal 30. The digital radio interface 86 converts the serialized data 30 back into parallel signals for further audio signal processing by the digital audio processing IC 14. Note that the serial-to-parallel and parallel-to-serial functionality of the digital radio interfaces 78 and 86 may be programmable based on the sample rate of the radio signal decoder IC 12, a desired data rate, or other parameters of the ICs 12 and 14 (for example, 44.1 KHz, 48 KHz, multiples thereof, and/or fractions thereof).

The digital radio interface 78 may convey more than left- and-right channel signals, shown as LPR signal 62 and the LMR signal 64. For instance, the digital radio interface 78 may convey Receive Signal Strength Indications ("RSSI") 66, data clock rates, control information, functionality enable/disable signals, functionality regulation and/or control signals, and Radio Data Service ("RDS") signals 68 between the ICs 12 and 14.

The interface between the integrated circuits 12 and 14 further includes a bi-directional interface 32. Such an interface may be a serial interface for the integrated circuits 12 and 14 to exchange control data and/or other type of data, including the enable signal 28, and/or the second enable signal. In one embodiment, the bi-directional interface 32 may be one or more serial communication paths that are in accordance with, but not limited to, the Inter-IC ("I²C") serial transmission protocol. As one of ordinary skill in the art will appreciate, other serial transmission protocols may be used for the bi-directional interface 32, which may also include one or more serial transmission paths.

The radio signal decoder integrated circuit 12 is operably coupled to a crystal oscillator module 38, which will be discussed in detail with reference to FIG. 4. The crystal oscillator module 38 is operably coupled to a crystal oscillator ("XTAL") 40 and produces therefrom a receive clock 36. The crystal oscillator module 38 has variable components and is operable to pull or center the XTAL 40. The phase locked-loop ("PLL") module 104 generates the receive clock 36 into a local oscillation 121 and/or a digital clock 129 based on the receive clock. The PLL module 104 may include a number phase locked loops or clock dividers, as appropriate, to also convert the receive clock 36 into an oscillation from which the system clock 26 is derived. In turn, the function of the real-time clock 88 is based upon the system clock 26. The front-end module 66 receives the local oscillation 121 for analog signal processing, and the digital clock 129 for analog-to-digital domain processes, which will be described in detail in reference to FIG. 4. The baseband processing module 70 receives the digital clock 129 for digital process and operations, which will be described in detail in reference to FIG. 5. For example, the system clock 26 may be the output oscillation of a phase locked loop, an oscillation that is a multiple or fraction of the output oscillation of the phase locked loop, or it may be derived from receive clock 36.

As one of ordinary skill will appreciate, the radio signal decoder IC 12 and the digital audio processing IC 14 may be implemented on separate ICs as shown in FIG. 1, may be implemented on the same IC, and/or each may be implemented on multiple ICs. As one of average skill in the art will further appreciate, the DC-DC converter may be off-chip and/or each IC 12 and 14 may have its own DC-DC converter.

Figure 2:
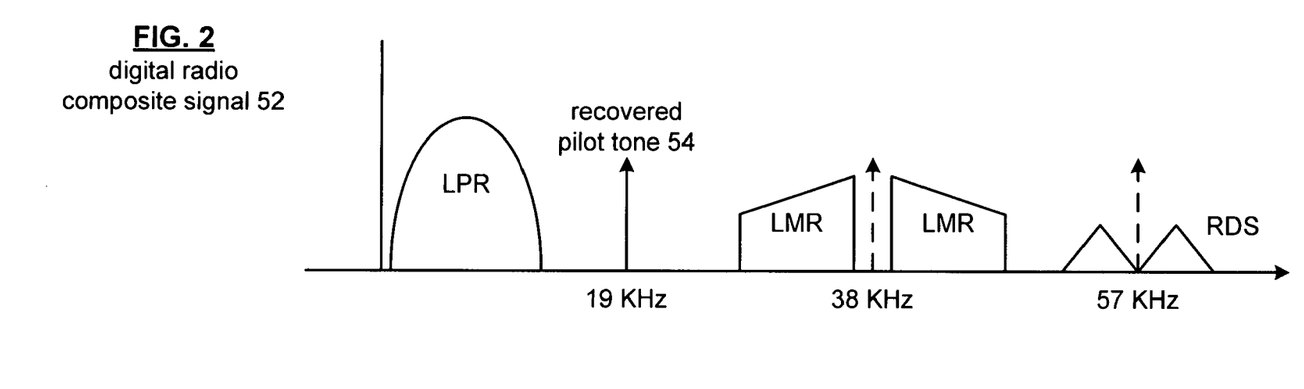
FIG. 2 is a frequency diagram of a digital radio composite signal format.

FIG. 2 is a frequency diagram of the digital radio composite signal used to carry stereophonic audio under a pilot-tone multiplex system. A pilot-tone multiplex system multiplexes the left and right audio signal channels in a manner compatible with mono sound, using a sum-and-difference technique to produce a "mono-compatible" composite signal. The signal includes a recovered pilot tone 54 at 19 kHz and another tone at 38 kHz. The signal 16 also includes digital left-channel and digital right-channel data in the form of a low frequency "sum" or left-plus-right ("LPR") signal component that corresponds to the LPR signal 72 and a higher frequency "difference" or left-minus-right ("LMR") signal component that corresponds to the LMR signal 74. Also shown is a radio data system ("RDS") signal component that corresponds to the RDS 76. The LMR signal component is modulated on the 38 kHz suppressed subcarrier to produce a double sideband suppressed carrier signal ("DSBCS"). The RDS signal component contains digital information including time and radio station identification, and uses a sub-carrier tone at 57 kHz.

Figure 3:
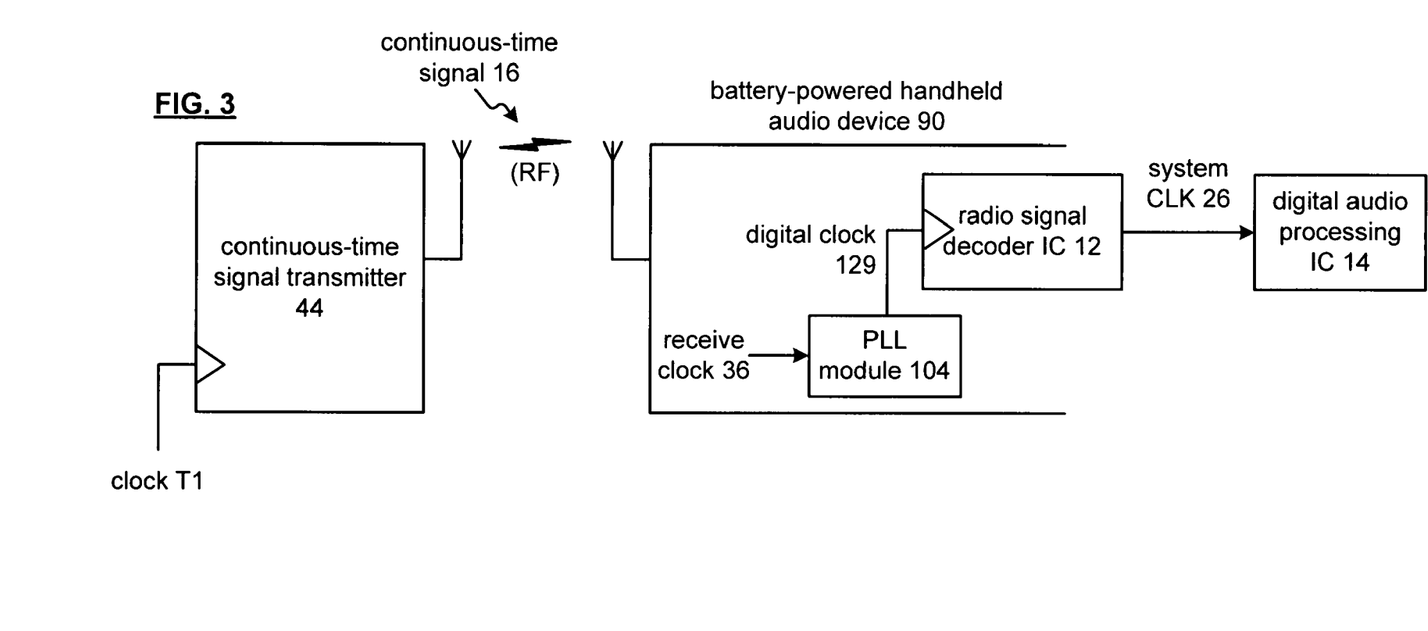
FIG. 3 is a functional block diagram illustrating a broadcast system that includes transmitter and receiver elements and operation thereof in accordance with the present invention.

FIG. 3 is a functional block diagram illustrating a broadcast system that includes a continuous-time signal transmitter 44 and a battery-powered handheld audio device 90. The continuous-time signal transmitter 44 includes a high-precision reference for the clock T1. A suitable high-precision reference for the clock T1 is a high-precision crystal, which has a low impurity level (that is, a low parts-per-million characteristic). Other suitable references may be used, such as a reference based upon global positioning satellite techniques, et cetera. The handheld audio device 90 includes the receive clock 36 and a phase-locked-loop ("PLL") 104 that generates a digital clock 129 for digital signal processing components of the radio signal decoder 12. The radio signal decoder IC 12 provides to the digital audio processing IC 14 a system CLK 26.

The continuous-time signal transmitter 44 has transmitter characteristics such as a power level (the effective radiated power or "ERP"), geographic location, and a carrier frequency (also referred to as the radio frequency or "RF"). The continuous-time signal transmitter 44 generates a continuous-time signal 16, such as a frequency modulated ("FM") radio signal, by modulating audio signals on the higher-frequency carrier associated with, or assigned to, the continuous-time signal transmitter 44. The clock T1 is based upon a high-precision reference to provide high precision modulation functionality. In operation, the continuous-time signal transmitter 44 generates the continuous-time signal 16 based on the carrier signal for the transmitter, and in this manner includes data at a transmit rate (from the signal transmitter 44). Also, a receiver requires high-precision transmissions from the broadcast transmitter to be able to correctly demodulate the continuous-time signal 16 by synchronizing the transmitted pilot tone and associated audio signals at their respective zero crossings. Although the example provided herein relates to radio frequency signals, other forms of continuous-time signals may be implemented with associated circuitry and processing techniques to provide high-precision references to the device 90, such as amplitude modulated ("AM") signals, a NTSC (National Television System(s) Committee) signals, an ATSC (Advanced Television Systems Committee) signal, et cetera.

In operation, the radio signal decoder IC 12 is "tuned" to the channel of the continuous-time signal 16 via radio frequency filters and the PLL module 104. The radio frequency filters pass the desired channel without substantively altering the carrier and modulation of the continuous-time signal 16 while blocking non-desired channel frequencies. As one skilled in the art will appreciate, the front end module 66 (see FIG. 1) processes the received continuous-time signal 16, such as by tuning the local oscillator frequency to convert the signal input to digital low IF signals 68, which will be discussed in detail with reference to FIG. 4. The processing operation by the radio signal decoder IC 12 is based on the clock signal of the receive clock 36 and the first error term $\Delta_1$, as will be discussed in detail with reference to FIG. 4.

The high-precision clock T1 provides an accurate reference (via the recovered pilot tone 54) to the receive clock 36, and the XTAL 40 may be centered or pulled based upon this high-precision reference. The adjustment of the crystal XTAL 40 will be discussed in detail with reference to FIGS. 4 through 12. In this manner, the XTAL 40 can be implemented by a crystal having higher ppm (parts per million) error values (that is, a less precise crystal), because the lower crystal precision can be compensated by knowledge of the high-precision reference, clock T1. Generally, the ppm error values reflect the crystal frequency tolerance, temperature stability, process variation, and voltage stability. As the ppm error values decrease (that is, the precision increases), the oscillator cost correspondingly increases. A higher ppm error value relates to lower clocking precision, which can cause timing errors with device functions needing a reliable clock source.

Figure 4:
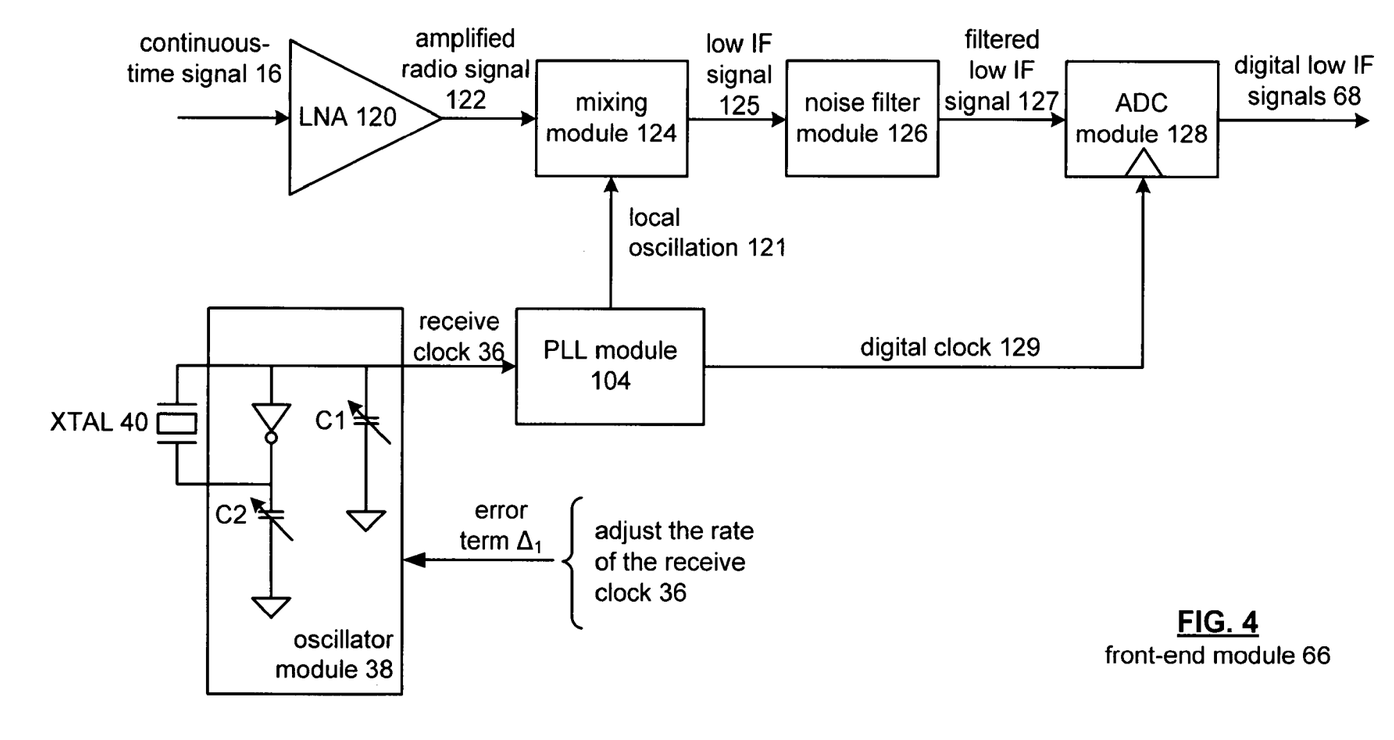
FIG. 4 is a schematic block diagram of a front-end module in accordance with the present invention.

FIG. 4 is a schematic block diagram of a front-end module 66 that includes a low noise amplifier ("LNA") 120, a mixing module 124, a noise filter module 126, and an analog-to-digital conversion ("ADC") module 128. The phase-locked loop ("PLL") 104 generates a local oscillation 121 based on the receive clock 36 output by the oscillator module 38. The digital components are clocked, via a digital clock 129, at a rate where the clock fundamental frequency and harmonic frequencies do not fall within the carrier radio frequency ("RF") of the received signal 16 (for example, a fractional rate such as two-thirds of the radio frequency RF). The digital clock 129 and/or the local oscillation 121 are generated based on the receive clock 36.

In operation, the continuous-time signal 16 is received at a receive rate corresponding to the receive clock 36. The continuous-time signal 16, which in the present example is a radio signal, includes data at a transmit rate (from the signal transmitter 44). The LNA 120 receives the continuous-time signal 16 and amplifies it to produce an amplified radio signal 122. The gain at which the LNA 120 amplifies the continuous-time signal 16 may be dependent on functions such as the magnitude of the continuous-time signal 16, the quality level of the digital low IF signals 68, etc. From the receive clock 36 generated by the oscillator module 38, the phase-locked loop ("PLL") 104 generates a local oscillation 121 in a fixed-phase relationship to the receive clock 36 to produce a desired intermediate frequency (for example, IF equals RF minus LO or IF equals LO minus RF). The mixing module 124 mixes the amplified radio signal 122 with the local oscillation 121 to produce a low intermediate frequency ("IF") signal 125. If the local oscillation 121 has a frequency that matches the frequency of the continuous-time signal 16, the low IF signal 125 will have a carrier frequency of zero or approximate thereto. If the local oscillation 121 is slightly less than the continuous-time signal 16, then the low IF signal 125 will have a carrier frequency based on the difference between the frequency of the continuous-time signal 16 and the frequency of local oscillation 121. In such a situation, the carrier frequency of the low IF signal 125 may range from zero-hertz to tens-of-megahertz.

The noise filter module 126 filters the noise or unwanted portions of the low IF signal 125 from the mixing module 124 into a filtered low IF signal 127. The ADC module 128, based upon the digital clock 129, converts the filtered low IF signal 127 into digital low IF signals 68.

In one embodiment, the low IF signal 125 is a complex signal including an in-phase component and a quadrature component. Accordingly, the ADC module 128 converts the in-phase and quadrature components of the filtered low IF signal 127 into corresponding in-phase and quadrature digital signals 68.

The oscillator module 38 includes variable capacitors C1 and C2 (for example, varactors) and an inverter coupled as shown. The variable capacitors C1 and C2 are varied with respect to an error term $\Delta_1$, for adjusting a system clock, such as the real-time clock 88 (see FIG. 1) that generates a clock signal based on the receive clock 36 and the error term $\Delta_1$. The error term $\Delta_1$ is determined as a function of the receive rate and the transmit rate, and generally represents the inaccuracies of the receive clock 36 with respect to the pilot tone of the radio composite signal 52. The generation of the error term $\Delta_1$ will be discussed in detail with reference to FIGS. 5 and 6.

The variable capacitors C1 and C2 vary the frequency of the oscillation by the XTAL 40, which can be a low cost, higher PPM crystal, upon the application of a tuning voltage in accordance with the error term $\Delta_1$. Generally, a decrease in capacitance causes an increase in the frequency of the receive clock 36, and an increase in capacitance causes a decrease in the frequency of the receive clock 36 thereby allowing the receive clock 36 to be tuned based on the recovered pilot tone 54. The variable capacitors have linear voltage with respect to capacitance characteristics (for example, hyperabrupt varactors) to reduce the complexity otherwise associated with non-linear devices. As one of ordinary skill in the art will appreciate, variable capacitors with non-linear characteristics may also be used with compensating circuitry, firmware, or a combination thereof. Alternate embodiments may also include capacitor banks with switches to switch in/out different size capacitors, so that the frequency of the crystal XTAL 40 can be adjusted.

Figure 5:
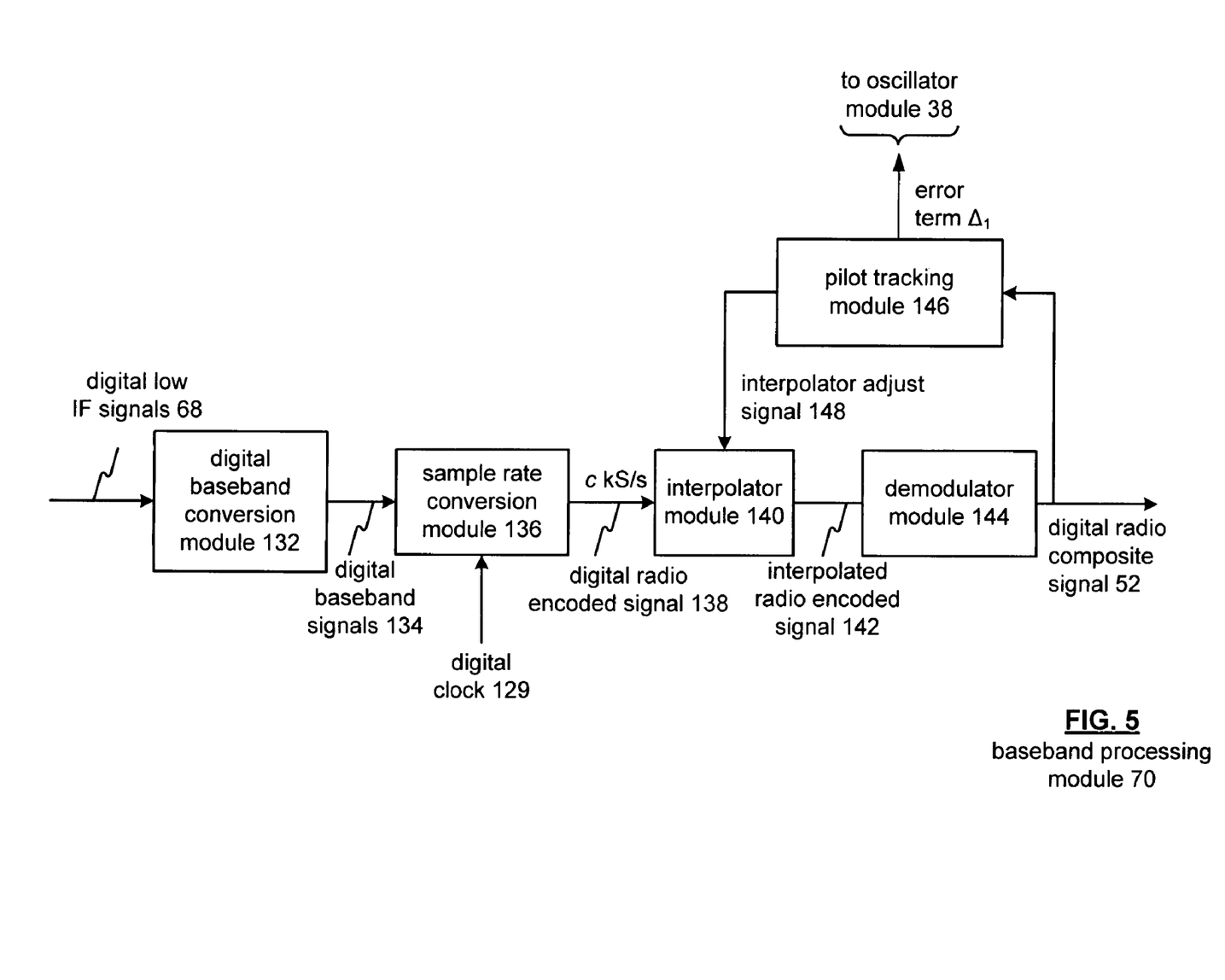
FIG. 5 is a schematic block diagram of a digital baseband processing module in accordance with the present invention.

FIG. 5 is a schematic block diagram of a digital baseband processing module 70 that includes a digital baseband conversion module 132, a sample rate conversion module 136, an interpolator module 140, a demodulation module 144, and a pilot tracking module 146.

The digital baseband conversion module 132 is operably coupled to convert the digital low IF signals 68 into digital baseband signals 134. Note that if the digital low IF signals 68 has a carrier frequency of zero, the digital baseband conversion module 132 primarily functions as a digital filter to produce digital baseband signals 134. If, however, the intermediate frequency is substantially non-zero, the digital baseband conversion module 132 functions to convert the digital low IF signals 68 to have a carrier frequency of zero (or approximately zero) and also performs digital filtering.

The sample rate conversion module 136 receives the digital baseband signals 152 to produce a digital radio encoded signal 138 at a substantially-constant rate of c kilo-samples/second (kS/s) (for example, 400 kS/s). The interpolator module 140 increases the resolution of the digital radio encoded signal 138 and, with the interpolator adjust signal 148, produces therefrom interpolated radio encoded signals 142. The demodulator module 144 demodulates the interpolated radio encoded signal 142 to produce a digital radio composite signal 52. The pilot tracking module 146, which will be described in greater detail with reference to FIG. 6, receives the digital radio composite signal 52 and generates an interpolator adjust signal 148, which operates to phase lock the interpolated radio encoded signals 142 to the recovered pilot tone 54.

The pilot tracking module 146 utilizes the known properties of the 19 KHz simulated pilot tone and the corresponding properties of the recovered pilot tone 54 embedded within the digital composite radio signal 52 (see FIG. 2) to determine the interpolator adjust signal 148. Generation of the error term $\Delta_1$ will be discussed in detail with reference to FIG. 6. The error term $\Delta_1$ represents the deviation of the crystal XTAL 40 with respect to the precision reference that the continuous-time signal transmitter 44 provides to the handheld audio device 90 via the pilot tone within the continuous-time signal 16. The error term $\Delta_1$ facilitates adjustment or compensation for less precise crystal XTAL 40. This adjustment or compensation provides greater clocking accuracy for the handheld audio device 90, such as with respect to operation of the real-time clock 88. That is, adjustment of the crystal XTAL 40 improves the clocking accuracy of the system CLK 26 that the radio signal decoder IC 12 provides to the digital audio processing IC 14. For example, the precision of the real-time clock 88 is based upon the precision of the system CLK 26.

Although the radio signal decoder IC 12 deploys a less precise crystal XTAL 40 (as compared to the crystal of the clock T1), the external timing reference provides a capability to improve the precision of components that rely on the accuracy of the clock signal, such as the system CLK 26 and in turn, the real-time clock 88, which is a digital clock that tracks the current time, even when the handheld audio device 90 is in an "off" state. Notably, adjustment or compensation to the clock references does not compensate for digital signal processing variances or errors. For example, adjustment of the crystal XTAL 40 does not affect the known imprecision of the sample rate conversion module 136. Also, the error term $\Delta_1$ may be periodically and/or on occasion accessed to generate a clock signal (or clock signals) with the receive clock 36. Examples of occasions in which to generate a clock signal includes selection changes in the station frequency (that is, the carrier RF) by a user, changes in environmental conditions (such as temperature, humidity, pressure changes), power-up of the handheld audio device, aging of the crystal, etc. Further, the crystal may be adjusted based upon a predetermined tolerance or drift of the crystal XTAL 40 with respect to the reference provided by the radio signal transmitter 44 via clock T1. When the value or magnitude of the error term exceeds a threshold of the predetermined tolerance, then the adjustment to the oscillator module 38 may be made to pull or center the crystal XTAL 40.

Figure 6:
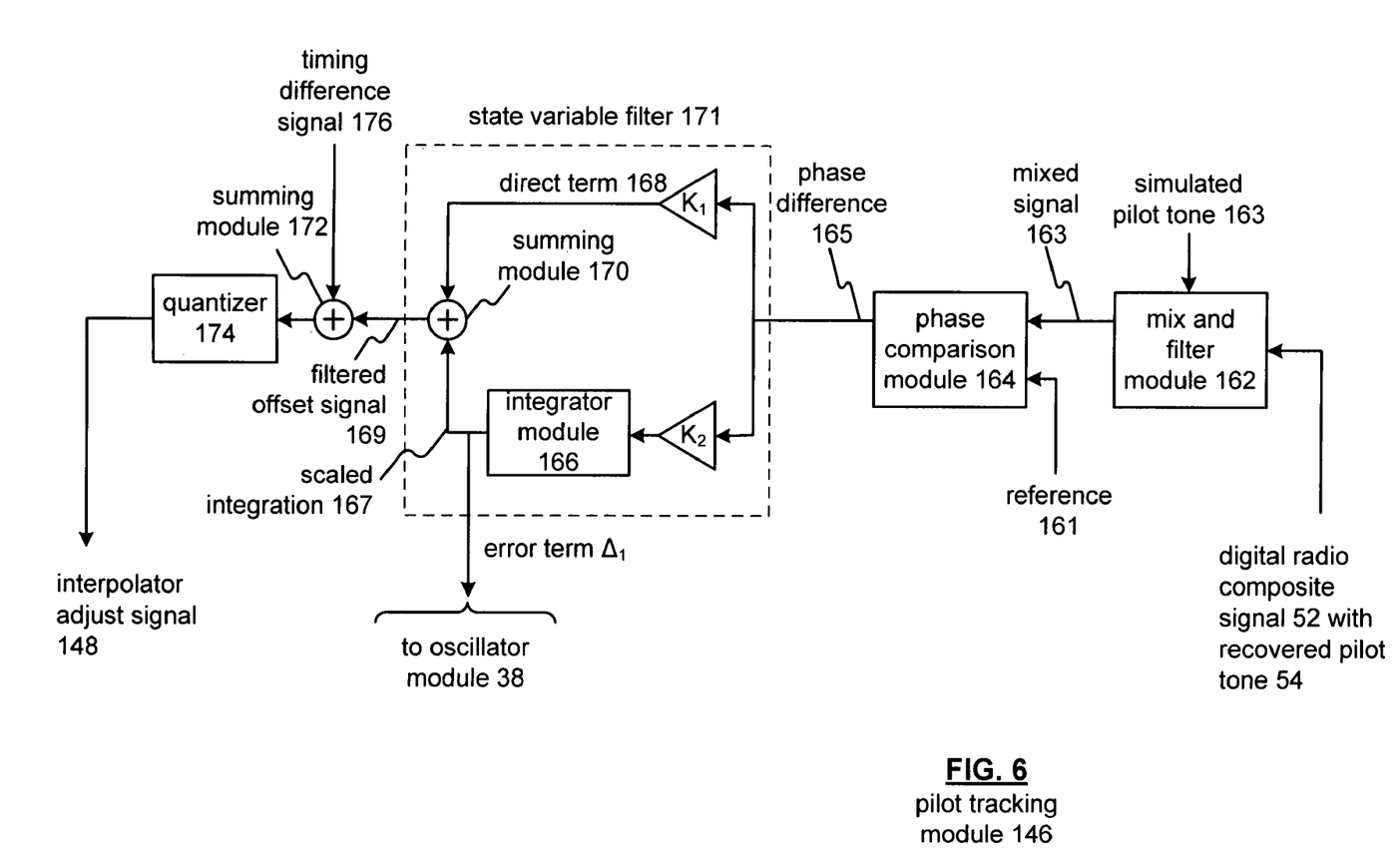
FIG. 6 is a schematic block diagram of a pilot tracking module in accordance with the present invention.

FIG. 6 is a schematic block diagram of the pilot tracking module 146. The pilot tracking module 146 includes a mix and filter module 162, a phase comparison module 164, a state variable filter 171, and a quantizer 174. The state variable filter 171 includes a gain K1, a gain K2, an integrator module 166, and summing modules 170 and 172.

The mix and filter module 162 mixes the digital radio composite signal 52 with a simulated pilot tone 163, which is based on the receive clock 36 rate, to produce a mixed signal 163. The phase comparison module 164 compares the near DC mixed signal 163 with a null signal or DC signal, via reference 161, to produce a phase difference 165. That is, the phase comparison module 164 compares the carrier frequency of the mixed signal 163 with DC signal to determine phase error. When the frequency of digital radio composite signal 52 matches the frequency of simulated pilot tone 163, the resulting near-DC mixed signal 163 will have a zero frequency such that the phase difference 165 will be zero. When, however, the frequency of the digital radio composite signal 52 does not substantially match the frequency of the simulated pilot tone 163, the resulting near-DC mixed signal 163 has a non-DC frequency. The phase difference 165 reflects the offset of the near-DC mixed signal 163 from the DC signal.

The state variable filter 171 receives the phase difference 165 and produces a filtered offset 169. State variable filter 190 is analogous to a loop filter within a PLL that includes a resistive term and a capacitative term to integrate the phase difference 165. The direct term included within the input to the state variable filter is analogous to the resistor in an analog PLL loop filter. An integration term coupled to the input to the state variable filter is analogous to a capacitor in an analog PLL loop filter. In this manner, the state variable filter 171 provides a memory element operable to store the correction output of the phase comparison module 164.

The amplifier K1 and the amplifier K2 receive the phase difference 165 to increase the gain of the phase difference. The output of the amplifier K1 produces a direct term 168. The output of the amplifier K2 is provided to the integrator module 166, producing therefrom a scaled integration 167. The scaled integration 167 provides the error term $\Delta_1$.

With respect to generating the interpolator adjust signal 148, the summing module 170 sums the direct term 168 and the scaled integration 167, and the summing module 172 further sums these terms with a level signal (that is, the timing difference signal 176, which corrects for known timing or sampling differences in the signal processing path of the baseband processing module 70, where these differences stem from factors apart from the precision of the crystal XTAL 40; that is, adjustment or centering of the crystal XTAL 40 does not affect these known timing or sampling differences) to normalize the output of the state variable filter 171 for the quantizer 174. The filtered offset signal 169 represents the unknown timing differences in the system due to such things that include process tolerance and temperature drift. The quantizer 174 produces an interpolator adjust signal 148.

The pilot tracking module provides an adjustment signal (that is, the error term $\Delta_1$) representing the difference between the recovered pilot tone 54 of the received continuous-time signal 16 and the reference tone (that is, the simulated pilot tone 163) with respect to the XTAL 40. Because of the high-precision-reference from the high-precision crystal of the continuous-time signal transmitter 44, the lower-precision XTAL 40 can be pulled or centered periodically and/or on occasion via the oscillator circuit 38, affording lower manufacturing and component cost, while providing a suitable timing reference for the radio signal decoder IC 12.

Figure 7:
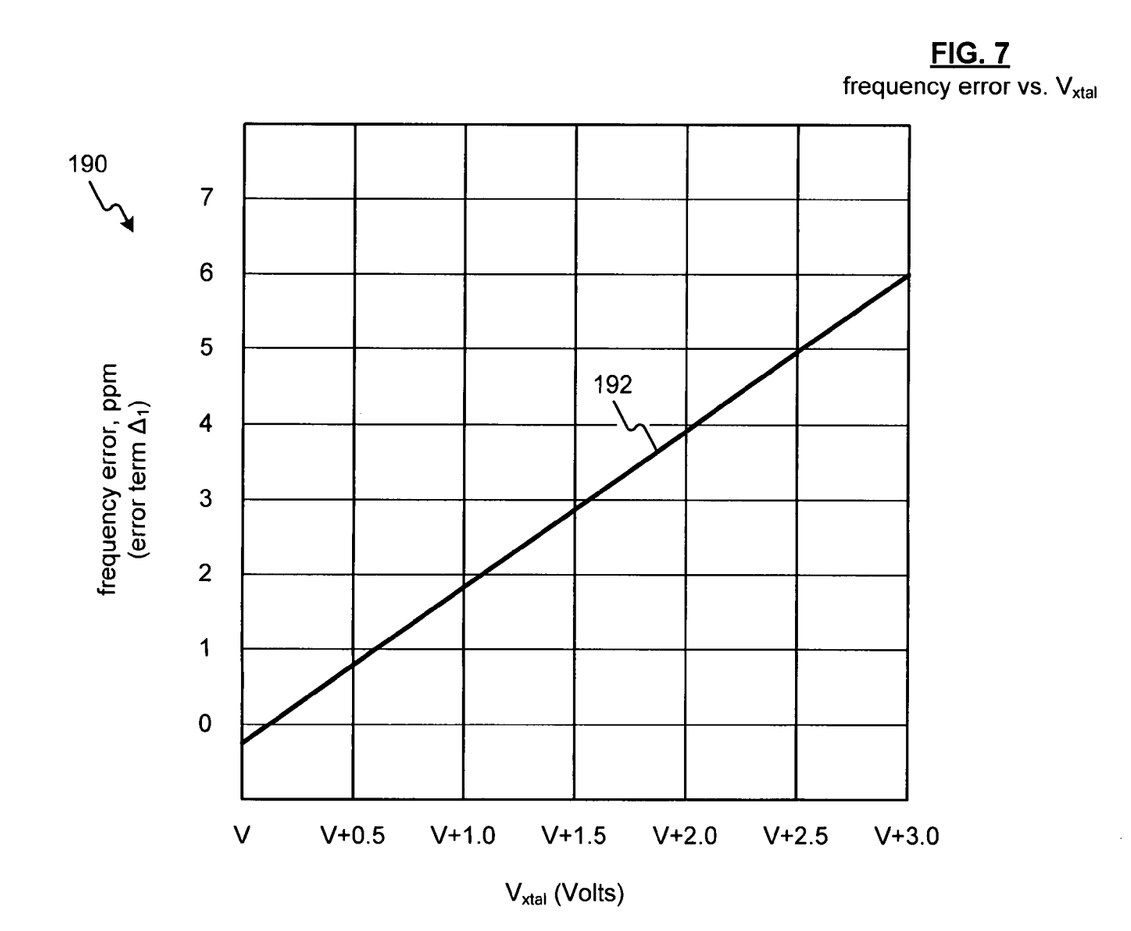
FIG. 7 illustrates a graph of frequency error versus crystal supply voltage in accordance with the present invention.

FIG. 7 illustrates a graph of frequency error versus crystal supply voltage. A substantially linear relationship exists between the voltage to the crystal (such as XTAL 40, see FIG. 1) and to the frequency error, which is provided by the error term $\Delta_1$. The error term dictates the effective voltage across the crystal to tune and/or pull the crystal towards the desired frequency according to the frequency error/voltage relationship indicated by line 192. The slope or relationship as illustrated is about 1 ppm to 1 volt (or 1:1). As one of ordinary skill in the art would appreciate, various crystals with various frequency-error-to-voltage characteristics may be used to adjust and/or compensate for frequency error of the associated crystal.

Figure 8:
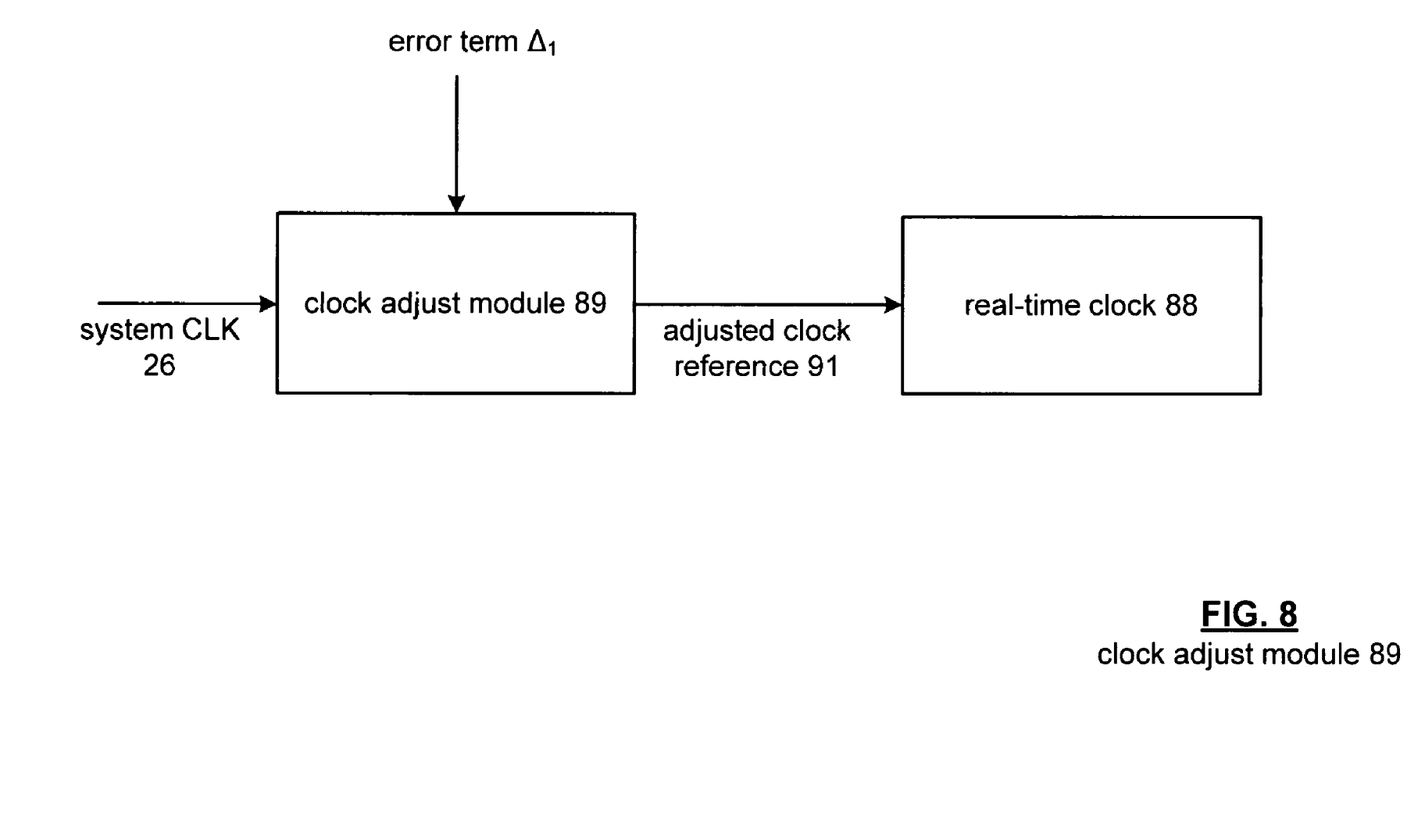
FIG. 8 is a block diagram of a clock adjust module in accordance with the present invention.

FIG. 8 is a block diagram of a clock adjust module 89 to adjust the clock reference to a real-time clock 88. The clock adjust module 89 generates an adjusted clock reference 91 based on the system CLK 26 and the error term $\Delta_1$. The clock adjust module 89 provides an alternative to pulling the crystal XTAL 40, and may be implemented by the processing module 13, which may be a single processing device or a plurality of processing devices. When multiple ICs are used to implement the handheld audio device 90, placing the clock adjust module 89 on the integrated circuit that includes the module can provide additional clock precision available by avoiding or minimizing variations between different integrated circuits, as well as noise that may affect the signal characteristics of the system CLK 26 as it is conveyed from one IC to another.

In generating the adjusted clock reference 91, the clock adjust module 89 determines a fractional error of the receive clock 36 based upon the error term $\Delta_1$. This fractional error is then used to adjust the system CLK 26 based on the receive clock 36 and to produce an adjusted clock reference 91. In this example, the real-time clock 88 receives the adjusted clock reference 91 to provide "current time" functionality. In an embodiment, the clock adjust module 89 may be provided as a divider circuit, and the generated adjusted clock reference 91 may be a nominal 1 Hz clock signal. As an example, when the error term $\Delta_1$ indicates that the crystal XTAL 40 is 10 ppm too fast (that is, with reference to the "centered" or objective frequency), and the nominal frequency of XTAL 40 is 24 MHz, then the clock adjust module 89 divides the system clock 26 by "24000240", to produce an accurate or centered 1 Hz frequency for the adjusted clock reference 91.

Figure 9:
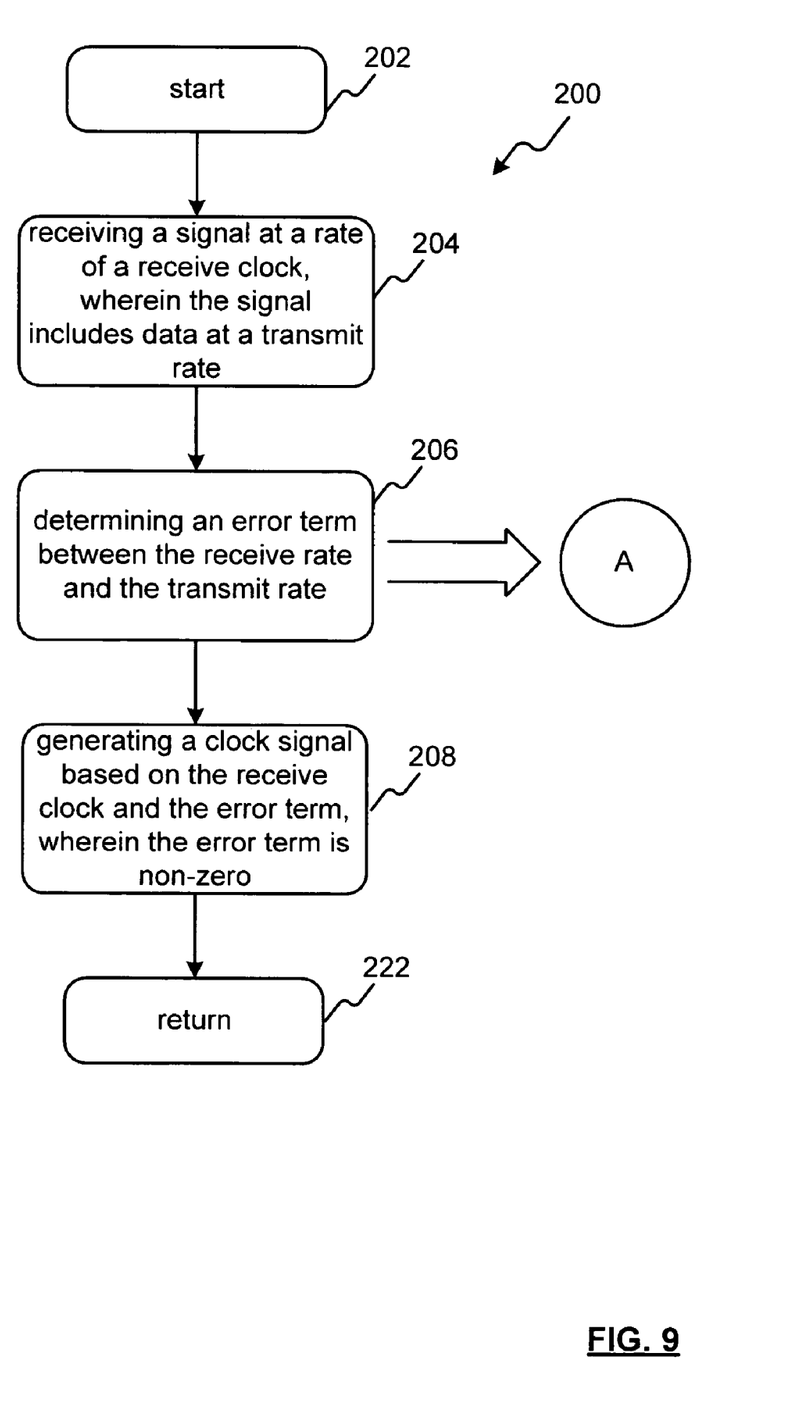
FIG. 9 is a logic diagram illustrating a method in accordance with the present invention.

FIG. 9 is a logic diagram of a method 200 associated with an embodiment of the present invention that begins at step 202. At step 204, a signal such as a continuous-time signal is received at a rate of a receive clock, wherein the signal includes data at a transmit rate. A radio signal transmitter 44 that includes a high-precision reference, such as a high precision crystal, for clock T1 (see FIG. 3) produces and/or broadcasts the continuous-time signal. Other high-precision references may be deployed within the radio signal transmitter, such as those under global positioning satellite ("GPS"). The reference is accessible via the recovered pilot tone 54 (see FIG. 2) through processing of the continuous-time signal to a digital radio composite signal 52. An error term is determined between the receive rate and the transmit rate at step 206, representing the variance associated with the crystal XTAL 40 of the handheld audio device. At step 208, a clock signal is generated that is based on the receive clock and the error term, wherein the error term is non-zero. A method for generating the error term of step 206 is depicted by flow A, which will be described in detail with reference to FIG. 11.

Figure 10:
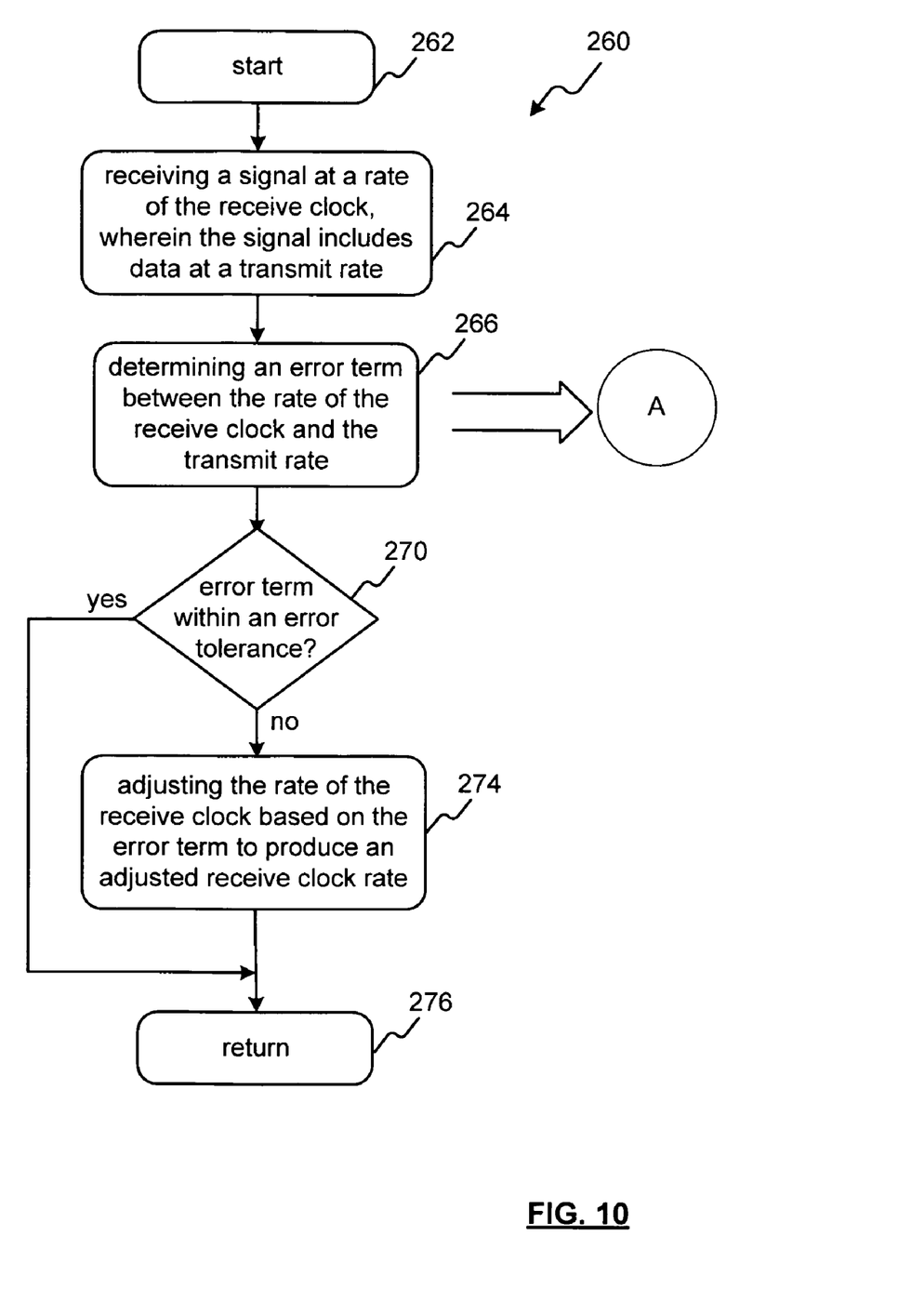
FIG. 10 is a logic diagram illustrating another method in accordance with the present invention.

FIG. 10 is another logic flow diagram of a method 260 associated with an embodiment of the present invention that begins at step 262. A radio signal transmitter 44 that includes a high-precision crystal for clock T1 (see FIG. 3) produces and/or broadcasts the continuous-time signal. The reference is accessible via the recovered pilot tone 54 (see FIG. 2) through processing of the continuous-time signal to a digital radio composite signal 52. At step 264, a signal such as a continuous-time signal is received at a rate of a receive clock, wherein the signal includes data at a transmit rate. An error term is determined between the receive rate and the transmit rate at step 266, and then determined whether the error term is within an error tolerance at step 268. When the error term is within an error tolerance at step 270, the method ends, or returns at step 276. When the error term is not within an error tolerance at step 270, the rate of the receive clock is adjusted based on the error term to produce an adjusted receive clock rate at step 274, and then returns at step 276. The use of an error tolerance reduces the frequency or occasion for adjusting the crystal XTAL 40 to minimize overcorrecting, which over time may not produce appreciable or detectable results. A method for generating the error term of step 266 is depicted by flow A, which will be described in detail with reference to FIG. 11.

Figure 11:
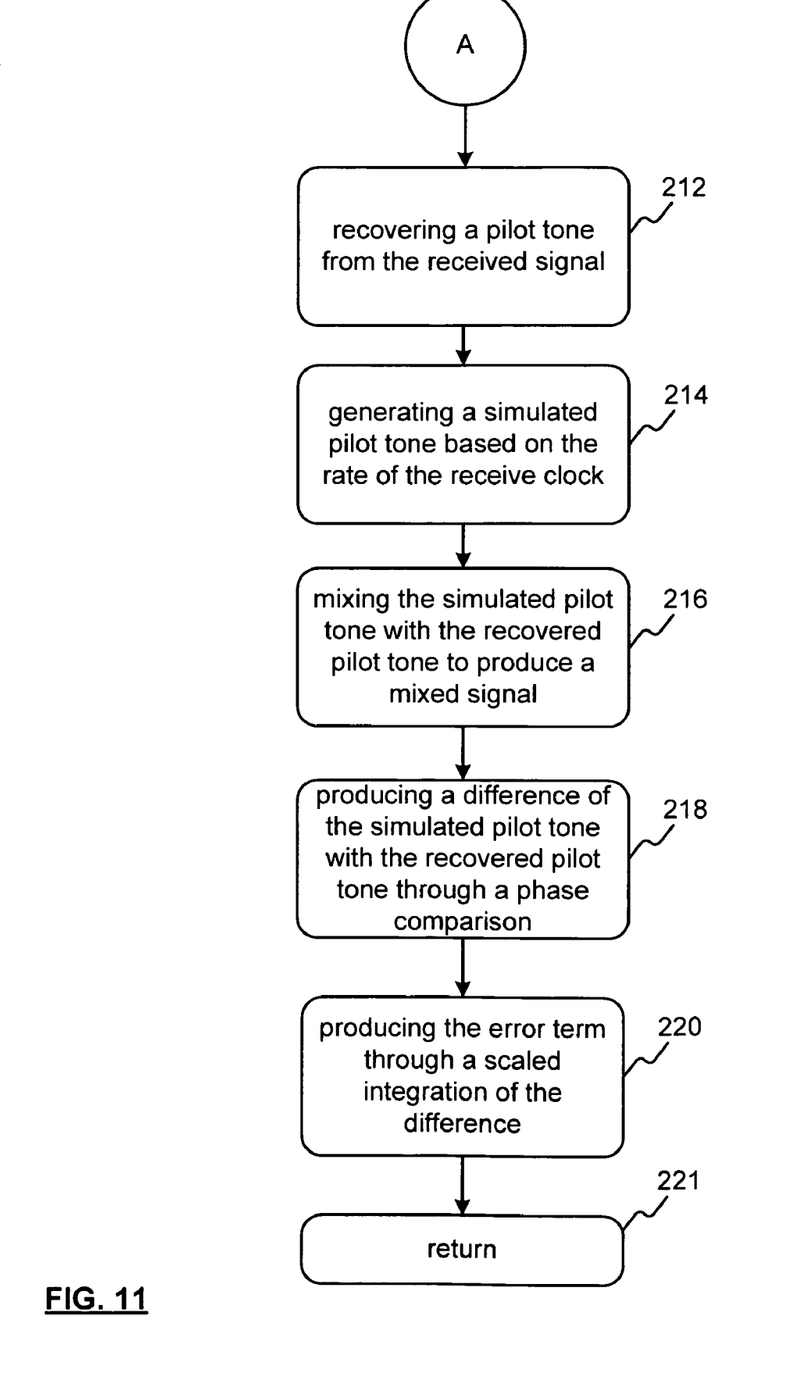
FIG. 11 is a logic diagram illustrating a method for generating of an error term in accordance with the present invention.

FIG. 11 is another logic flow diagram of generating an error term based on the error term of step 206 of method 200 or of step 266 of method 260. At step 212, a pilot tone is recovered from the received signal. A simulated pilot tone based on the rate of the receive clock is generated at step 214. As oscillator module 38 produces the receive clock 36, it follows that the receive clock 36 is based upon the crystal XTAL 40, and accordingly, reflects the precision level of the crystal 40. At step 216, the simulated pilot tone is mixed with the recovered pilot tone to produce a mixed signal. A difference of the simulated pilot tone with the recovered pilot tone is produced through a phase comparison at step 218, and the error term, at step 220, is produced through a scaled integration of the difference.

The error term, effectively resulting from the mixing and comparison of the receive clock with the clock T1 of the radio signal transmitter 44, represents the departure or travel of the crystal XTAL 40 from the clock reference of clock T1. In this manner, the error term provides a value that may be used to pull the crystal XTAL 40 to center, or a value that may be utilized in software, firmware, hardware, or a combination thereof, to adjust a clock signal to bring it into the level of precision that the clock T1 offers. In this manner, the crystal XTAL 40 may have a lower precision level than that of the clock T1, allowing for cost and production savings otherwise associated with high-precision crystals. Further, such an ability to adjust or pull the crystal XTAL 40 extends the useful lifespan for the device 90 overall in that crystal precision deteriorates with age—accordingly, although the precision of the crystal XTAL 40 decreases over time, the embodiments provided herein compensate for the crystal precision and performance of the crystal, as well as declining crystal precision over time.

Figure 12:
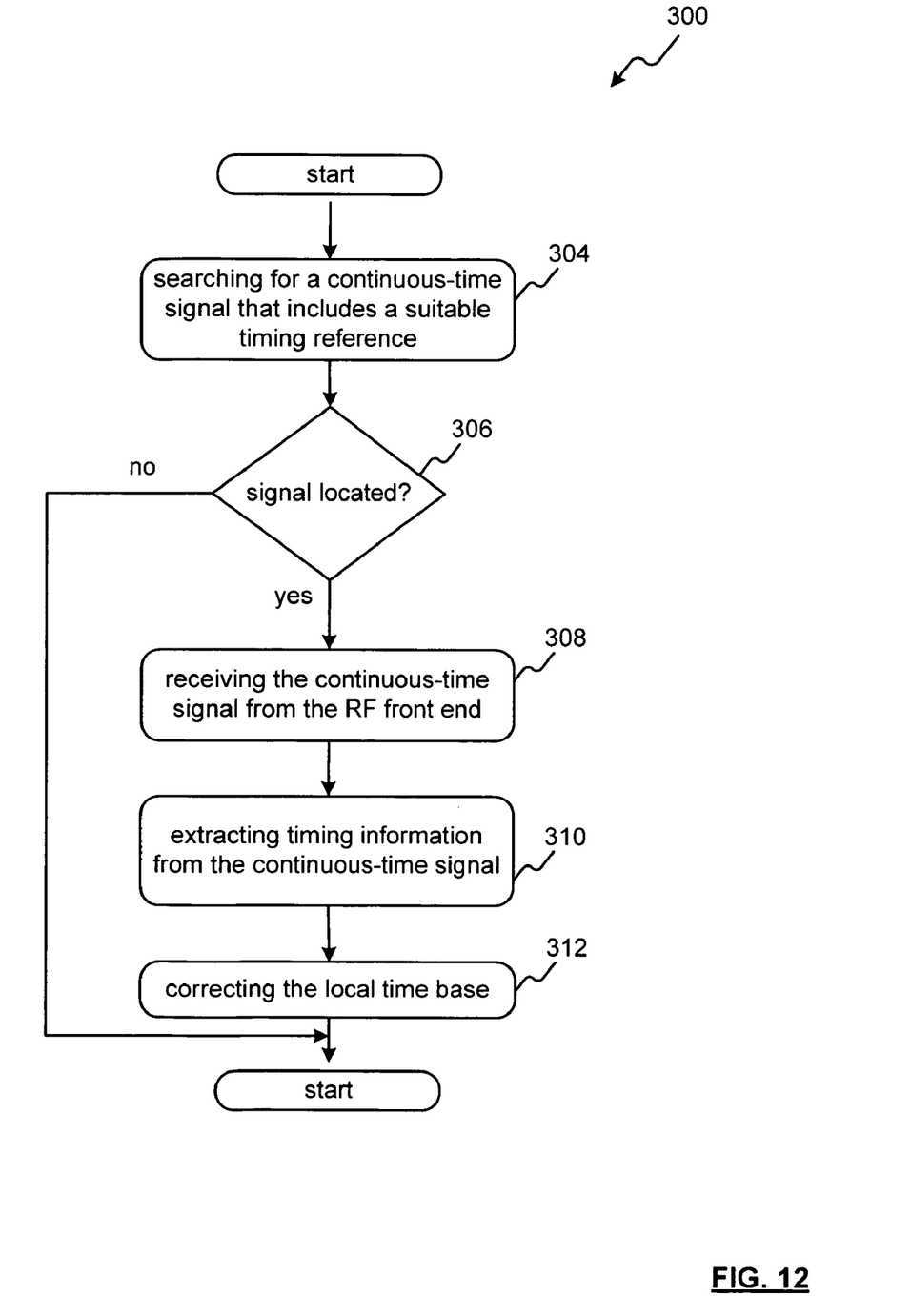
FIG. 12 is a logic diagram illustrating a method for correcting a local time base of a handheld media device in accordance with the present invention.

FIG. 12 is a logic diagram of a method 300 for correcting a local time base of a handheld media device, such as that of handheld audio device 90, or a device capable of processing media information including video signals, still images and/or a combination thereof. The method 300 provides the capability to selectively correct the local time base for a media device.

At step 304, a search for a continuous-time signal, such as a radio frequency signal, is undertaken. The continuous-time signal includes a suitable timing reference for correcting the local time base. For example, with frequency modulated signals, a suitable timing reference is available by an embedded pilot tone carried with signal, and which provides a timing reference generated by the higher-precision crystal of the radio signal transmitter. The searching for the signal can be made upon a priori knowledge, can be made by scanning the appropriate frequency band for the signal, or by other suitable searching techniques.

When the continuous-time signal is located at step 306, the continuous-time signal is received from the front end at step 308, and timing information is extracted at step 310. At step 312, the local time base is corrected using the timing information extracted from the continuous-time signal. Correction of the local time base can be made, for example, by adjusting a crystal that generates the local time base, or by producing an adjusted clock reference with a clock adjust module that serves as the local time base. When the continuous-time signal is not located at step 306, such as when a time-out occurs for predetermined search duration.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

The preceding discussion has presented a handheld device that incorporates a radio signal decoder including a method for adjusting a system clock based upon a transmitter timing reference provided by a broadcast transmitter. As one of average skill in the art will appreciate, other embodiments may be derived from the teaching of the present invention without deviating from the scope of the claims.

What is claimed is:

1. A radio signal decoder comprising:
a front-end module operably coupled to, when enabled, convert a received radio signal into digital data in accordance with a rate of a receive clock, wherein the received radio signal includes data at a transmit rate; and
a baseband processing module operably coupled to process the digital data and to produce therefrom output digital data, wherein the baseband processing module includes:
a processing module; and
memory operably coupled to the processing module, wherein the memory stores operational instructions that cause the processing module to:
determine an error term between the rate of the receive clock and the transmit rate by:
recovering a pilot tone from the received signal;
generating a simulated pilot tone based on the receive clock;
mixing the simulated pilot tone with the recovered pilot tone to produce a mixed signal;
producing a difference of the simulated pilot tone and the recovered pilot tone based on the mixed signal; and
producing the error term based on the difference;
determine whether the error term is within an error tolerance; and
when the error term is not within the error tolerance, adjust the rate of the receive clock based on the error term to produce an adjusted receive clock rate.

2. A radio signal decoder comprising:
a front-end module configured to, when enabled, convert a received radio signal into digital data in accordance with a rate of a receive clock, wherein the received radio signal comprises a frequency modulated ("FM") radio signal, which includes an embedded pilot tone that corresponds to the transmit rate and includes data transmitted at a transmit rate; and
a baseband processing module operably coupled to said front-end module, said baseband processing module configured to process the digital data and to produce therefrom output digital data, wherein the baseband processing module includes:
a processing module; and
memory operably coupled to the processing module, wherein the memory stores operational instructions that cause the processing module to:
determine an error term between the rate of the receive clock and the transmit rate;
determine whether the error term is within an error tolerance; and
when the error term is not within the error tolerance, adjust the rate of the receive clock based on the error term to produce an adjusted receive clock rate.

3. A radio signal decoder comprising:
a front-end module configured to, when enabled, convert a received radio signal into digital data in accordance with a rate of a receive clock, wherein the received radio signal includes data transmitted at a transmit rate; and
a baseband processing module operably coupled to said front-end module, said baseband processing module configured to process the digital data and to produce therefrom output digital data, wherein the baseband processing module includes:
a processing module; and
memory operably coupled to the processing module, wherein the memory stores operational instructions that cause the processing module to:
determine an error term between the receive rate and the transmit rate; and generate a clock signal based on the receive clock and the error term, wherein the error term is non-zero by:
  determining a fractional error of the receive clock based upon the error term; and
  adjusting the clock signal based on the receive clock and the fractional error.

4. A radio signal decoder comprising:
a front-end module configured to, when enabled, convert a received radio signal into digital data in accordance with a rate of a receive clock, wherein the received radio signal includes data transmitted at a transmit rate; and
a baseband processing module operably coupled to said front-end module, said baseband processing module configured to process the digital data and to produce therefrom output digital data, wherein the baseband processing module includes:
  a processing module; and
  memory operably coupled to the processing module, wherein the memory stores operational instructions that cause the processing module to:
    determine an error term between the receive rate and the transmit rate by:
      recovering a pilot tone from the signal;
      generating a simulated pilot tone based on the receive clock;
      mixing the simulated pilot tone with the recovered pilot tone to produce a mixed signal;
      producing a difference between the simulated pilot tone and the recovered pilot tone based on the mixed signal; and
      producing the error term based on the difference; and
    generate a clock signal based on the receive clock and the error term, wherein the error term is non-zero.

5. A radio signal decoder comprising:
a front-end module configured to, when enabled, convert a received radio signal into digital data in accordance with a rate of a receive clock, wherein the received radio signal comprises a frequency modulated ("FM") radio signal, which includes an embedded pilot tone that corresponds to the transmit rate, and includes data transmitted at a transmit rate; and
a baseband processing module operably coupled to said front-end module, said baseband processing module configured to process the digital data and to produce therefrom output digital data, wherein the baseband processing module includes:
  a processing module; and
  memory operably coupled to the processing module, wherein the memory stores operational instructions that cause the processing module to:
    determine an error term between the receive rate and the transmit rate; and
generate a clock signal based on the receive clock and the error term, wherein the error term is non-zero.

* * * * *